J. N. CLEES, Dec'd,

J. CLEES, administrator. C. C. BURROUGHS assignor; said BURROUGHS assignor to UNION IRON WORKS.

Grain-Separator.

No. 8,775. Reissued June 24, 1879.

Witnesses:
W.B. Masson
W.E. Bowen

Inventor
J. N. Clees.
Caleb C. Burroughs assignee,
by E.E. Masson atty

N. PETERS, PHOTO-LITHOGRAPHER, WASHINGTON, D. C.

UNITED STATES PATENT OFFICE.

CALEB C. BURROUGHS, OF DECATUR, ILLINOIS, ASSIGNEE OF JOSEPH CLEES, ADMINISTRATOR OF J. N. CLEES, DECEASED; SAID BURROUGHS ASSIGNOR TO UNION IRON WORKS, OF SAME PLACE.

IMPROVEMENT IN GRAIN-SEPARATORS.

Specification forming part of Letters Patent No. 43,390, dated June 5, 1864; Reissue No. 8,775, dated June 24, 1879; application filed March 28, 1879.

*To all whom it may concern:*

Be it known that J. N. CLEES, formerly of Darbyville, in the county of Pickaway and State of Ohio, (now deceased,) did during his life-time invent a new and Improved Grain-Separating Machine; and I do hereby declare that the following is a full, clear, and exact description of the same, reference being had to the accompanying drawings, making a part of this specification, in which—

Figure 1:
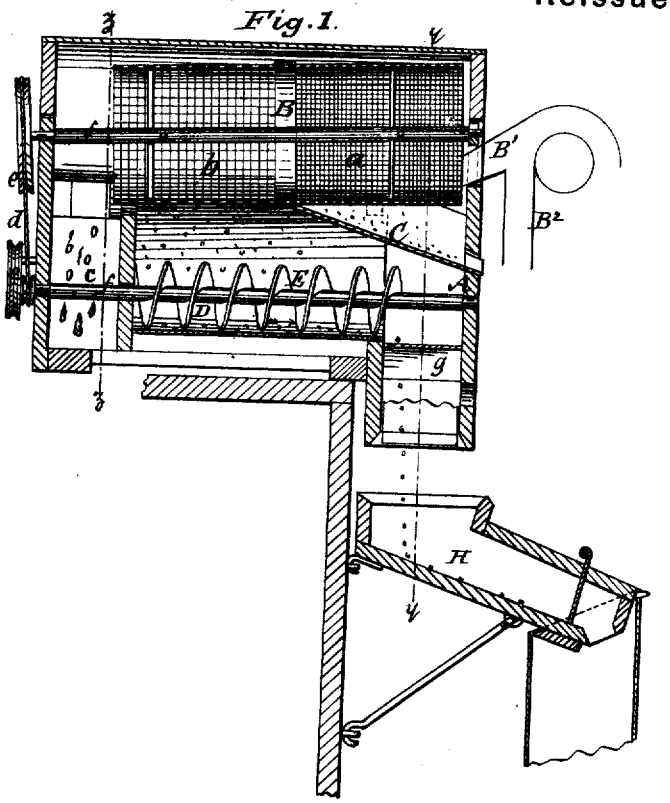
Figure 2:
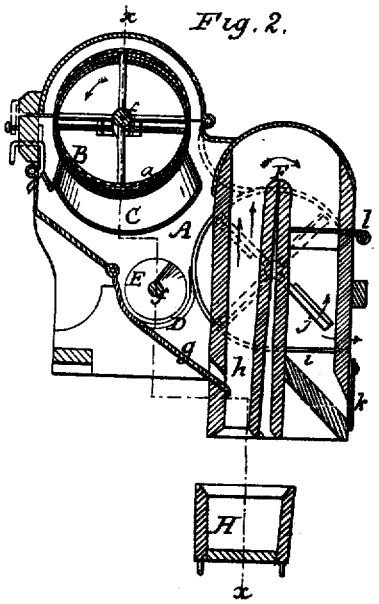
Figure 3:
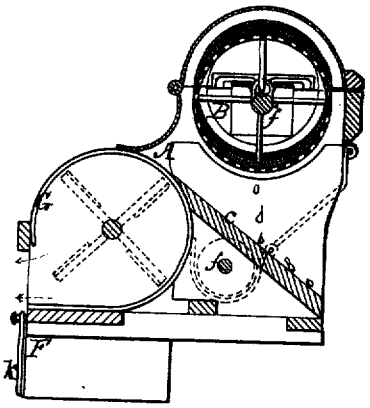
Figure 4:
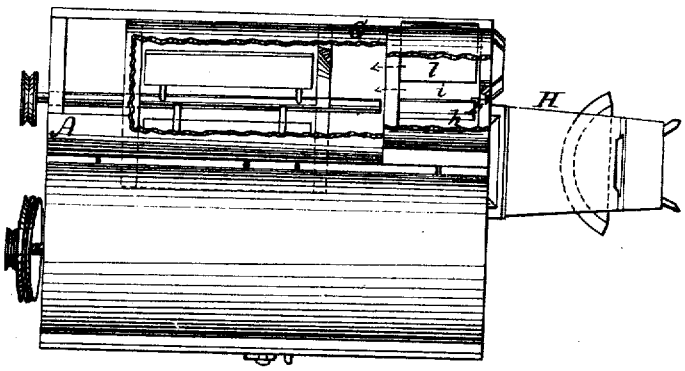

Figure 1 is a longitudinal vertical section of the improved machine, taken on line *x x* of Fig. 2. Fig. 2 is a transverse vertical section of the same, taken on the line *y y* of Fig. 1. Fig. 3 is a transverse vertical section of the same, taken on line *z z* of Fig. 1. Fig. 4 is a plan or top view of the same.

Similar letters of reference indicate corresponding parts in the several figures.

This invention relates to a new and improved grain-separator, designed chiefly to be applied to thrashing-machines, and to operate conjointly therewith, so that the grain may be thrashed and cleansed or separated from all impurities at one and the same operation; but it may be used independently from a thrashing-machine, and upon any size or kind of grain desired, by adapting the meshes of the screen to said grain, or to the purpose required.

The invention consists in a rotary cylindrical screen, one end of which is made of coarse wire and the other of fine wire, for the purpose of separating the straw, sticks, heads of grain, or cobs from the grain. The latter, falling into a trough, is carried by a spiral conveyer to the discharge-spout, where it falls upon a chute, by which it is spread and conveyed into a suction-blast trunk to remove all light impurities, and through which it falls into another hopper or receiving-bags, ready for delivery.

To enable others skilled in the art to fully understand and construct the invention, I will proceed to describe it as used in separating and cleaning wheat.

A represents a box or case, which incloses the working parts of the machine, and which may be constructed in any proper manner. In the upper part of this box or case A there is placed an inclined rotating screen, B, one part, *a*, of which is provided with wire-cloth of a fine mesh, to admit of foreign substances smaller than wheat passing through it—such, for instance, as sand, smut, cockle, chess, &c. The other portion, *b*, is provided with wire-cloth having a mesh sufficiently coarse to admit of wheat passing through it, but not coarse foreign substances, such as wheat-heads, pieces of sticks, stones, &c. These latter substances fall from the depressed end of the screen upon an inclined board or chute, *c*, and are conducted to the feed end of the thrashing-machine, to be subjected to a second thrashing operation. The fine foreign substances which pass through the fine part *a* of the screen fall upon a chute, C, by which they are conveyed out of the case A and fall into any proper receptacle prepared to receive them.

The wheat passes through the coarse part *b* of the screen and falls into a trough, D, in which a screw-conveyer, E, is placed. This conveyer may be constructed in the usual way, and from it the screen is rotated by means of a belt, *d*, which passes around pulleys *e e* at the ends of the shafts *f f* of the screen and conveyer, as shown in Fig. 1. The conveyer E moves the wheat along in the direction indicated by the arrow, and discharges it upon a chute, *g*, which spreads and conducts it into the lower end, *h*, of a suction-blast spout or trunk, F, which is at one end of a fan-box, G, the latter communicating with the part *i* of the blast-spout by means of an opening, *j*. The lower end of the part *i* of the blast-spout is provided with a flap, *k*, opening outward, as shown in Fig. 2, and in the lower part of *i* there is placed a horizontal slide, *l*, by adjusting which the strength of the suction-blast in F may be regulated as desired.

The two parts *h i* of the blast spout or trunk are placed side by side, and connected at their upper ends by an arched or curved passage, as shown in Fig. 2.

The sound wheat, on account of its superior gravity, is able to resist the action of the suction-blast in the part *h* of the spout F, and it consequently falls from *h* into a hopper, H, which conducts it into a bag or any receptacle prepared to receive it. The light impurities—such as dust, smut, shrunken grain, &c.—are carried up the part *h* by the suction-blast, and the heavier portions of such substances fall to the bottom of the part *i*, while the lighter portions are drawn into the fan-box G and expelled from the lower part of the outer side thereof. The dotted arrow in Fig. 4 shows the direction of the light impurities, and the full-line arrows, Fig. 2, show the direction of the shrunken grain, &c. The latter accumulate in the bottom of the part *i* of the separating-trunk F, and are discharged from time to time therefrom as their weight becomes sufficient to open the flap *k*.

This device may be placed on the top of a thrashing-machine, and the grain in its impure state delivered into the elevated or receiving end of the rotary screen B through a hopper or delivery-spout, $B^1$, of a suitable elevator, $B^2$.

The device has been practically tested and performs its work in a perfect manner.

Having thus fully described this invention, I claim—

1. The rotating screen B, composed of a fine and a coarse portion, *a b*, the spiral conveyer E, and suction-blast spout F, all combined to operate in the manner substantially as and for the purpose herein set forth.

2. The combination of a rotating screen, a conveyer, a chute or grain-spreader leading from the conveyer and projecting into a suction-blast trunk, and a suction-fan, substantially as and for the purpose described.

3. The combination of a rotating screen, a hopper or spout, $B^1$, conveyer D, separating-trunk, and suction-fan, substantially as and for the purpose described.

CALEB C. BURROUGHS.

Witnesses:
A. R. MONTGOMERY,
RAY LOUGHBOM.

Correction in Reissue Letters Patent No. 8,775.

It is hereby certified that in the granting clause of these Reissue Letters Patent the term is erroneously recited as beginning on "the fifth day of June, one thousand eight hundred and sixty-four." It should read *for the term of seventeen years from the fifth day of July, one thousand eight hundred and sixty-four*, to agree with the term recited in the granting clause of the original patent, No. 43,390, on file in this Office.

August 6, 1879.